July 8, 1930.  B. B. WHITTAM  1,769,979
DOOR
Filed April 6, 1926  6 Sheets-Sheet 2
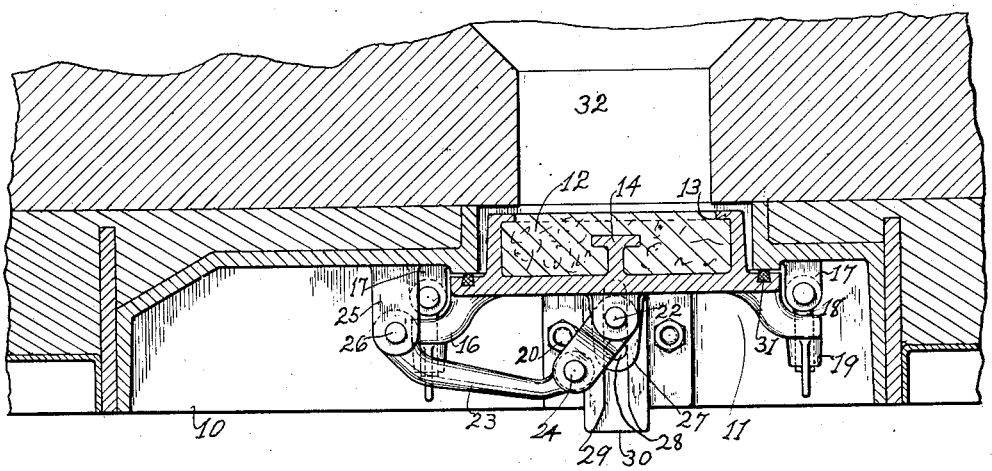
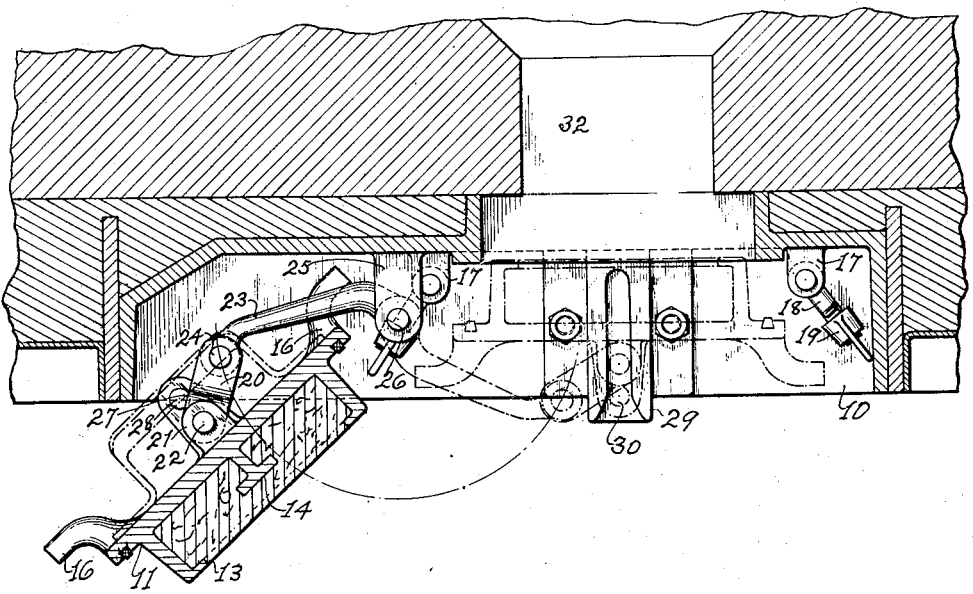
Benjamin B. Whittam, INVENTOR
BY
Gifford & Scull ATTORNEYS July 8, 1930.  B. B. WHITTAM  1,769,979
DOOR
Filed April 6, 1926   6 Sheets-Sheet 3
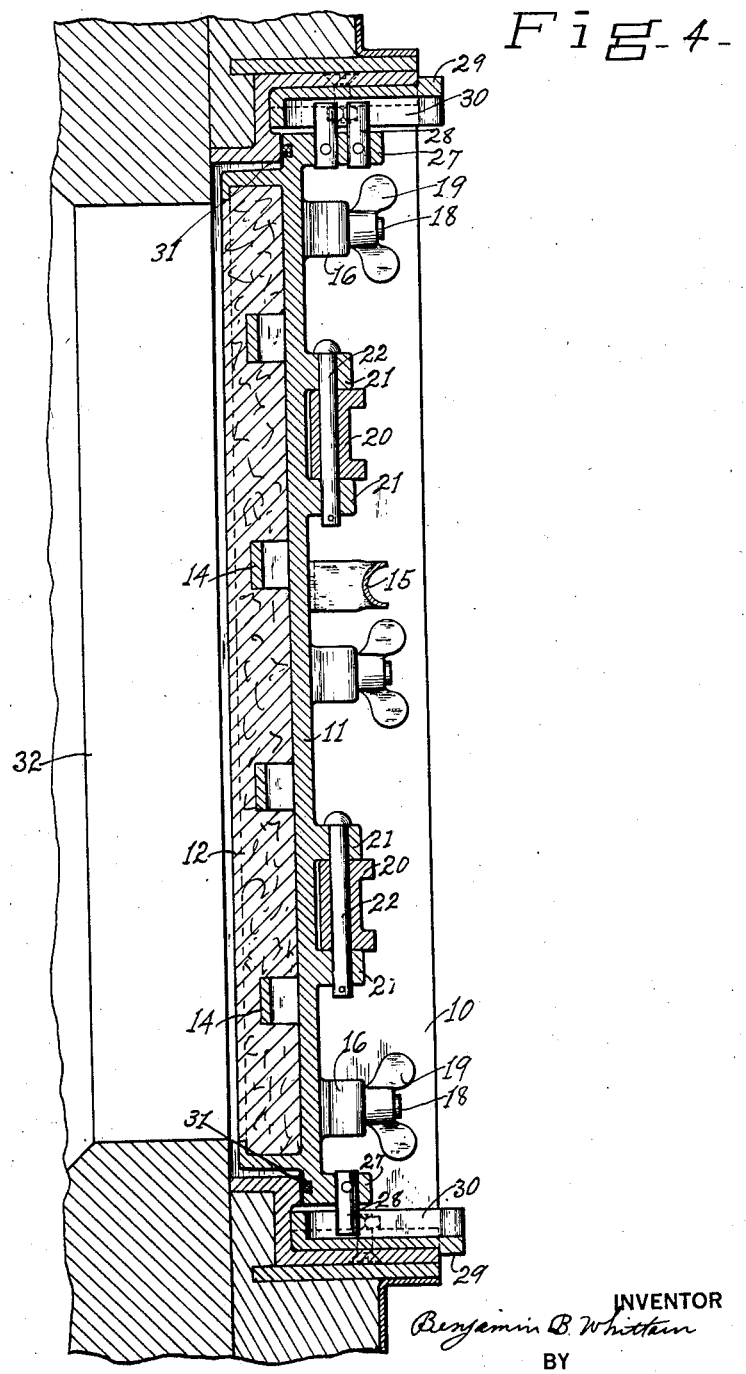
Fig-4-
INVENTOR
Benjamin B. Whittam
BY
Gifford & Scull  ATTORNEYS July 8, 1930.  B. B. WHITTAM  1,769,979
DOOR
Filed April 6, 1926  6 Sheets-Sheet 4

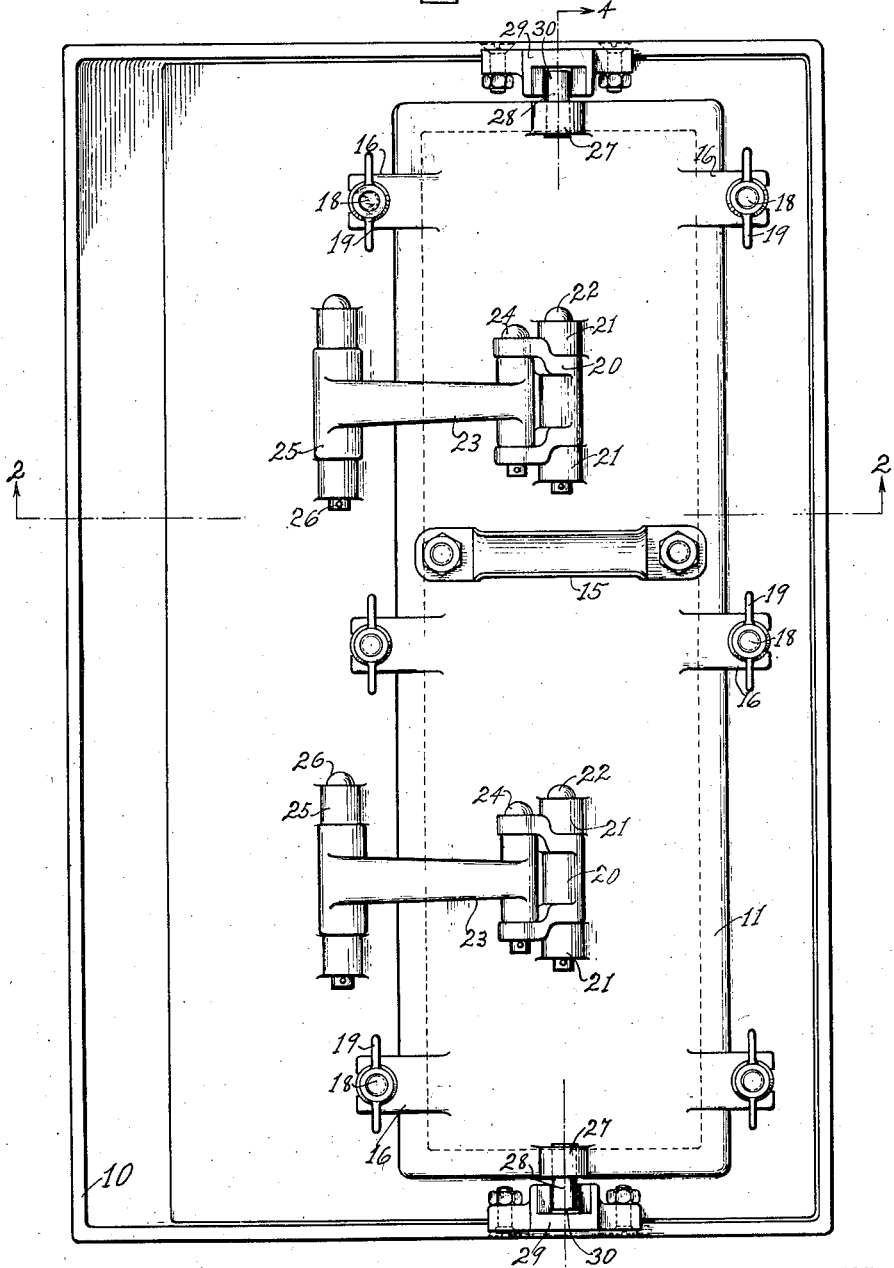

INVENTOR
Benjamin B. Whittam
BY
Gifford & Scull  ATTORNEYS

July 8, 1930. B. B. WHITTAM 1,769,979
DOOR
Filed April 6, 1926  6 Sheets-Sheet 6

INVENTOR
Benjamin B. Whittam
BY
Gifford & Scull ATTORNEYS

Patented July 8, 1930

1,769,979

UNITED STATES PATENT OFFICE

BENJAMIN B. WHITTAM, OF ELIZABETH, NEW JERSEY, ASSIGNOR TO THE BABCOCK & WILCOX COMPANY, OF BAYONNE, NEW JERSEY, A CORPORATION OF NEW JERSEY

DOOR

Application filed April 6, 1926. Serial No. 100,043.

Figure 5:
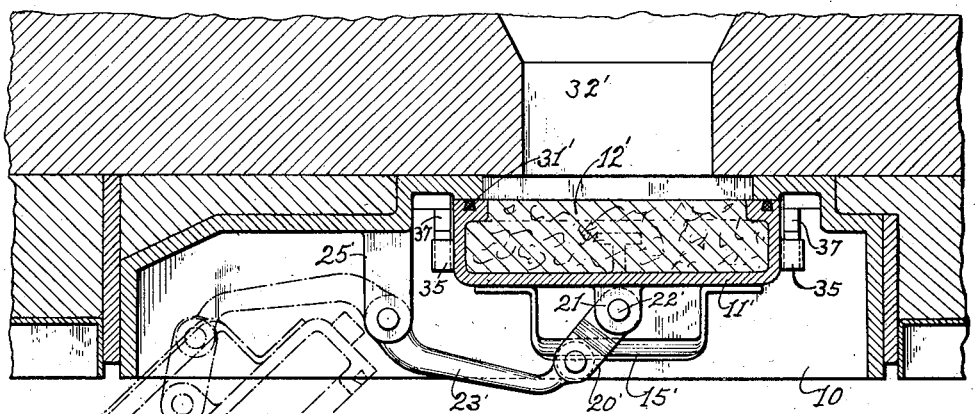
Figure 6:
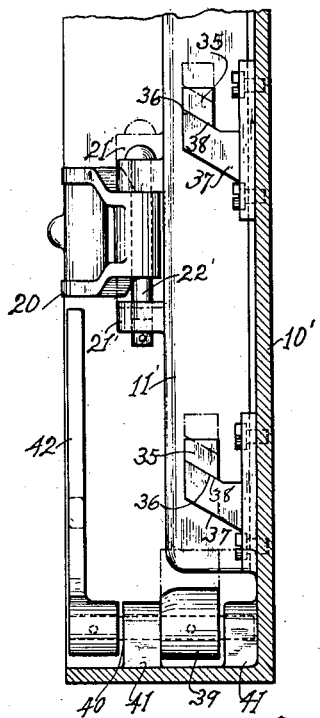
Figure 7:
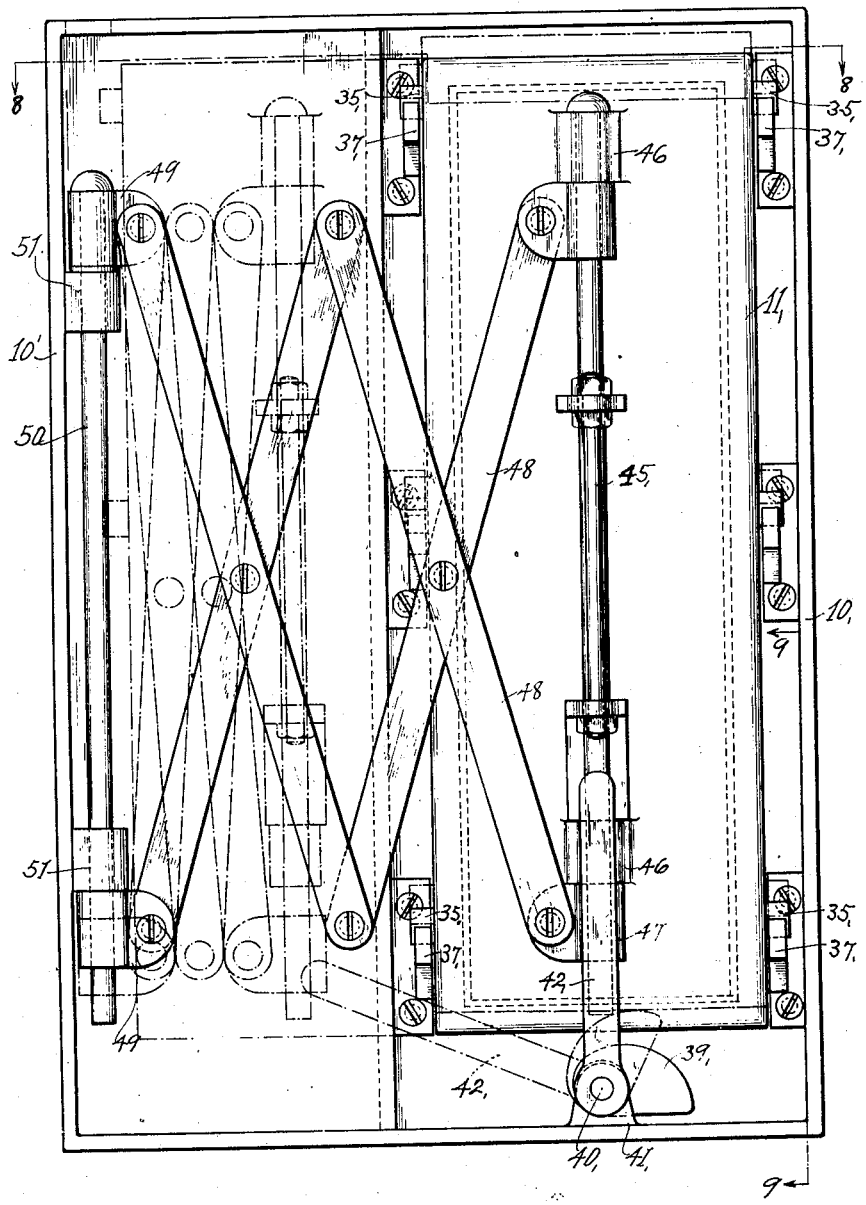
Figure 8:
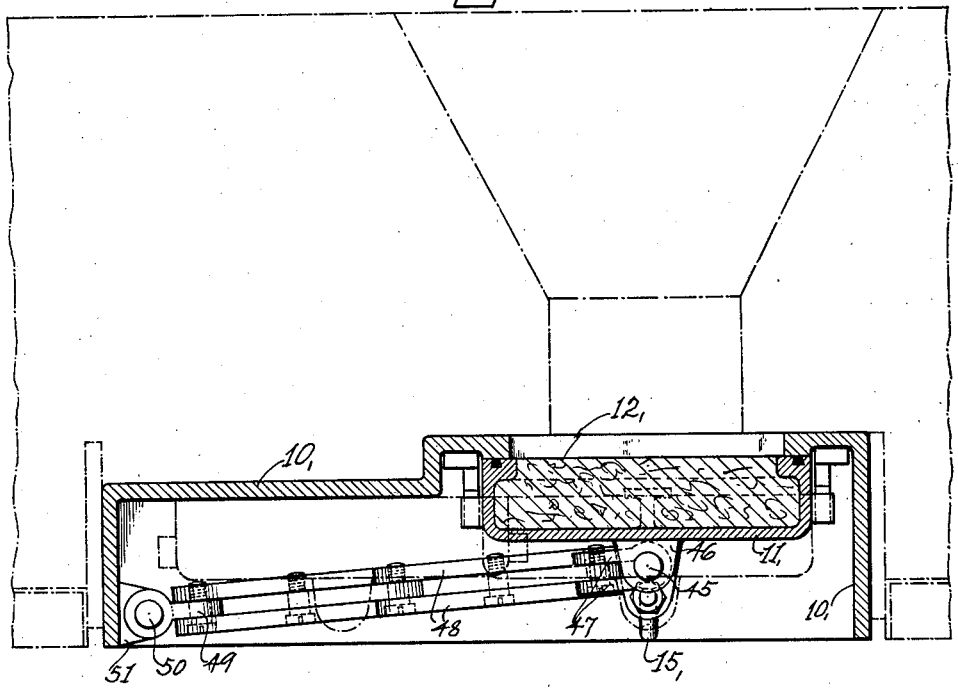
Figure 9:
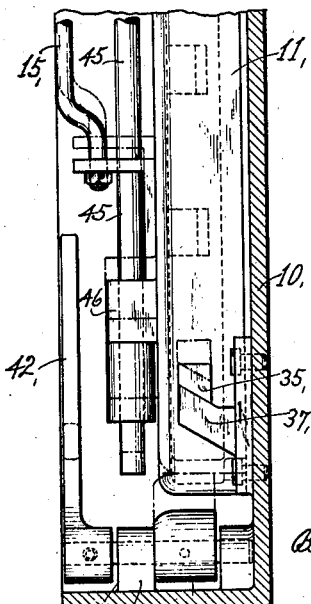

This invention relates to doors that are especially adapted to be moved into and out of position in front of openings that are made in furnace walls, through which steam lances or the like may be inserted for cleaning the tubes of water tube boilers, although it is not restricted to this particular use. The invention will be understood from the description in connection with the accompanying drawings, in which Fig. 1 is a front view of the door; Fig. 2 is a section along the line 2—2 of Fig. 1; Fig. 3 is a similar view showing the door in a different position; Fig. 4 is a section along the line 4—4 of Fig. 1; Fig. 5 is a section similar to Fig. 3 showing a modification; Fig. 6 is a vertical section through the modification; Fig. 7 is a side view of a second modification; Fig. 8 is a horizontal section through the same, and Fig. 9 is a vertical section thereof. In the drawings, reference character 10 indicates a flanged casing in which the door may be set, this casing being mounted in the outer wall of a boiler furnace, for example, and with the flanges extending outwardly, as shown. A hollow door 11 of metal is filled with a packing 12 of insulating material, the door being provided with flanges 13 and flanged ribs 14 to keep the insulating material in place. The door is provided with a handle 15 upon the front side thereof and bifurcated lugs 16 along the edges thereof. The casing 10 is also provided with bifurcated lugs 17 in which rods 18 carrying wing nuts 19 are pivoted. Links 20 are pivoted in lugs 21 on the outside of the door and are connected by pivot pins 22 to the lugs. Hinges 23 connected by pins 24 to the links 20 at one end are connected at their other ends to the lugs 25 on the casing 10 by means of the pins 26. The upper and lower ends of the door are provided with lugs 27 which carry guide pins 28. The casing 10 is provided with guides 29 that have guide slots 30 whose entry ends flare outwardly. The edges of the door are provided with gaskets 31 set in dovetailed grooves in the door. An opening 32 in the furnace or other wall is indicated, in proximity to which the door may be mounted.

The operation is as follows: The door 11 is swung into position in front of the opening 32, so that the pins 28 at the top and bottom of the edges of the door, respectively, enter the guide slots 30 in the guides 29, and when the door has been moved to its closing position, the rods 18 pivoted on the lugs 17 are moved within the bifurcated ends of the lugs 16, and the wing nuts are screwed down to fasten the door in place. When it is desired to open the door, the wing nuts are loosened, the rods 18 are swung away from the door and the door pulled straight outwardly, with the pins 28 riding in the guide slots 30, and may then be swung into the position shown in Fig. 3. By using guiding means as just described, it will be seen that the door is actually guided into and out of position in the opening in the casing. This will avoid damage to the door and also to the sides of the opening.

In the modification shown in Figs. 5 and 6, instead of having the door fastened in position by means of the wing nuts, the door is held in position by means of beveled lugs. The parts shown in Figs. 5 and 6 corresponding to like parts in Figs. 1 to 4 are designated by reference characters with primes, so that it is not thought necessary to describe the same again in detail. In addition, the sides of the door 11' are provided with lugs 35 that have beveled faces 36. Catches 37 are attached by bolts to the casing 10', and are provided with sloping faces 38 on their upper sides, against which the sloping faces on the lugs 35 come into contact. A cam 39 on the shaft 40 mounted in bearings 41 at the bottom of the casing 10' is operated by the handle 42 to lift the door, so that the lugs 35 will assume the positions indicated in dotted lines in Fig. 6, the length of the pin 22' and the distance between the lugs 21' being sufficient to permit this vertical movement of the door, after which the door can be swung open, as indicated in dotted lines in Fig. 5. In both modifications above described, the links 20 and the links 20' make the door movable horizontally from its hinge pivot, so that the door can be adjusted horizontally just before it has been moved to its closed position.

In the modification shown in Figs. 7, 8 and 9, in which parts similar to those already described, are shown with the same reference characters, with the subscript "1", the rod 45 passes loosely through the lugs 46 on the door. Lugs 47 are loosely mounted upon the rod 45 and are connected to the toggle members 48 which are hinged by means of the lugs 49 upon the pivot rod 50 that is mounted in lugs 51 on the casing $10_1$, this arrangement forming a lazy tongs device, exemplifying an expansible connection between the door and the pivot.

In the modification shown in Figs. 7, 8 and 9, when the handle $42_1$ of the cam $39_1$ is turned, the door $11_1$ is lifted as shown in dotted lines in Figs. 7 and 9, so that the lugs $35_1$ can move past the lugs $37_1$, and the door can swing outwardly and then to the left, as shown in dotted lines in Fig. 7. Since the upper lugs 49 of the toggle rests upon the upper lug 51 of the casing $10_1$, and the upper lug 46 of the door $11_1$ rests upon the upper lug 47 of the toggle, the door will be prevented from moving downwardly, and since the lower lug 49 of the toggle is loose upon the rod 50, and the lower lug 47 of the toggle is loose upon the rod 45, the toggle is permitted to collapse and move the door parallel to the rear wall of the casing $10_1$, so that the door can be opened without the necessity of swinging the same outwardly beyond the edges of the furnace wall, the door being substantially within the limits of the flanges of the casing during its entire movement.

I claim:

1. In combination, a casing having an opening therein, a door adapted to close said opening, pivots on said door and said casing, and a lazy tongs device connecting said pivots.

2. In combination, a casing having an opening therein surrounded by outwardly extending flanges, a door adapted to close said opening, a pivot on said casing and within said flanges, and an expansible connection between said pivot and said door.

3. In combination, a casing having an opening therein surrounded by outwardly extending flanges, a door adapted to close said opening, pivots on said door and said casing within said flanges, and an expansible connection between said pivots whereby the door may operate substantially within the limits of said flanges.

4. In combination, a casing having an opening therein surrounded by outwardly extending flanges, a door adapted to close said opening, a pivot on said casing within said flanges, and a hinge connecting said door to said pivot.

5. In combination, a furnace casing having an opening therein, a door adapted to close said opening, pivots on said casing and on said door, a connection between said pivots and comprising a plurality of members pivoted together, means to move said door lengthwise of one of said pivots, and locking means operated by said movement.

6. In combination, a furnace casing having an opening therein, a door adapted to close said opening, pivots on said casing and on said door, a connection between said pivots and comprising a plurality of members pivoted together, a cam on said casing and adapted to move said door lengthwise of one of said pivots, and cooperating locking members on said casing and door and brought into and out of cooperative relation by said movement.

7. In combination, a casing having an opening therein surrounded by outwardly extending flanges, a door adapted to close said opening, a pivot on said casing, a second pivot on said door, and a plurality of hinge members pivoted together and connecting said pivots.

BENJAMIN B. WHITTAM.